May 7, 1957     H. KASTAN     2,791,386
TRUSS CORE
Filed Oct. 19, 1953     3 Sheets-Sheet 1
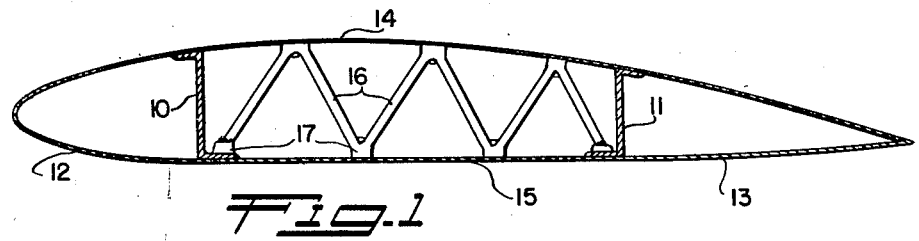
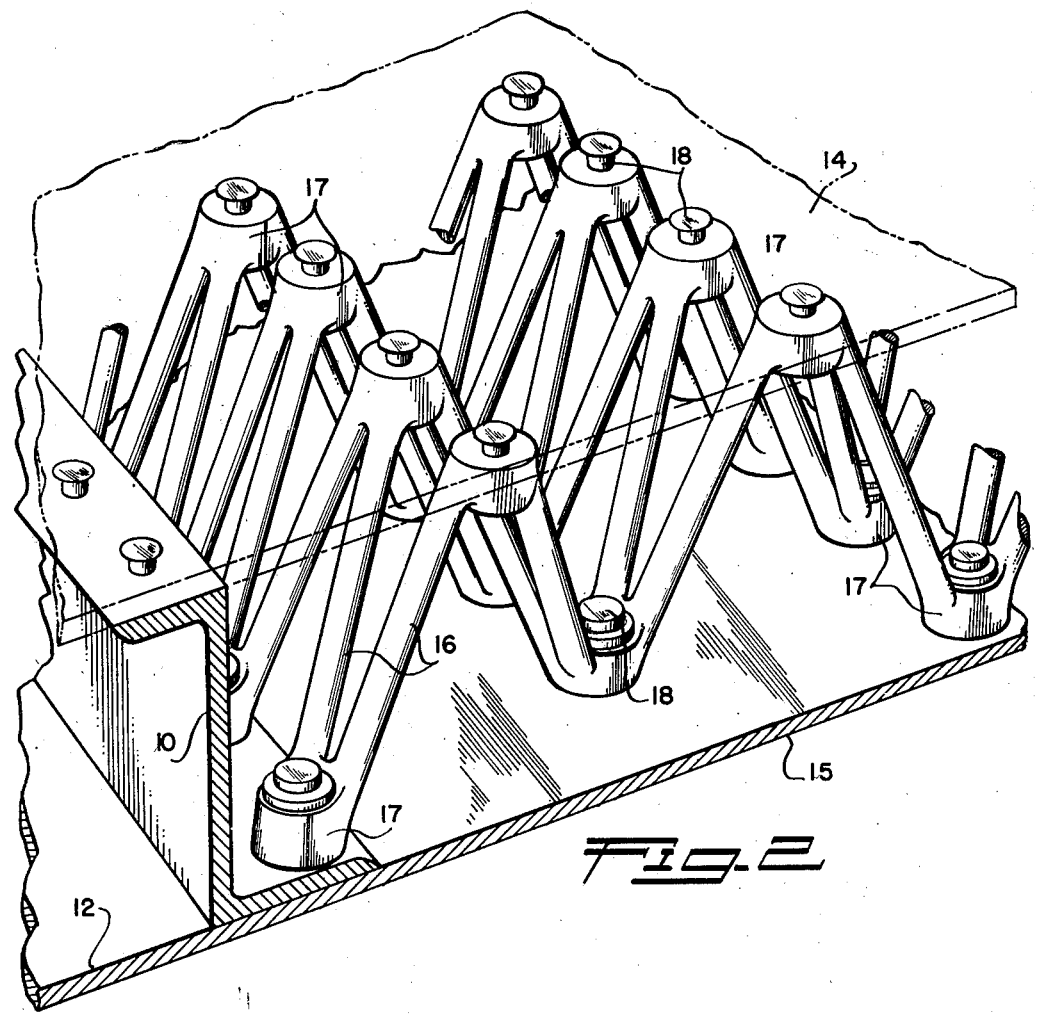
INVENTOR.
HOWARD KASTAN
BY
Agent May 7, 1957     H. KASTAN     2,791,386
TRUSS CORE Filed Oct. 19, 1953     3 Sheets-Sheet 2

INVENTOR.
HOWARD KASTAN
BY
*George C. Sullivan*
Agent

May 7, 1957  H. KASTAN  2,791,386
TRUSS CORE
Filed Oct. 19, 1953  3 Sheets-Sheet 3

INVENTOR.
HOWARD KASTAN
BY
George A. Sullivan
Agent

United States Patent Office 2,791,386
Patented May 7, 1957

2,791,386

TRUSS CORE

Howard Kastan, North Hollywood, Calif., assignor to Lockheed Aircraft Corporation, Burbank, Calif.

Application October 19, 1953, Serial No. 386,858

1 Claim. (Cl. 244—123)

This invention relates to structural truss cores for aircraft airfoils, structural panels and box type structural beams with superior shear bending and torsional characteristics.

Present metal aircraft panel structures are conventionally constructed of sheets and stiffeners supported by ribs or formers, or as sandwich panels with plastic, balsa wood or honeycomb cores. Box structures are generally ribs and spars, or all spars, or periodically spaced posts, with stiffened or unstiffened sheet coverings. This invention contemplates the provision of a highly efficient structural core with desirable stiffness characteristics which serves as a continuous framing element to which are attached panel or box beam facing elements. Such a framing element provides multi-directional paths for shear loads and shear stiffness even if parts of the core are damaged, as by gun fire.

It is a primary object of this invention to provide a framework core of diagonal intersecting truss type elements joined at their points of inter-section by bosses to which facing elements are attached thus forming a truss core continuous in all directions for transmitting shear loads and supporting the facing elements.

It is also an important object of this invention to provide a structural core of the type described which does not restrain the facing elements from expansion or contraction, thus eliminating the introduction of thermal stresses due to differential temperatures between the various elements of the structure.

It is a further object of this invention to provide a core, for the purpose described, forming a space framework of continuous shear diagonals extending in all directions, with the peaks of several diagonals attached to chord or cap members and arranged in rows forming alternate peaks and valleys wherein the valleys adjacent to one chord or cap provide ready internal access to the peaks adjacent the other chord or cap for attaching the peaks to the chords or caps.

It is also an object of this invention to provide a truss core in the form of a space framework that can be readily formed by casting, molding, forging, welding, brazing, glueing, cutting from extrusions, or by blanking and forming or expanding flat plate stock, using alloys similar or dissimilar to the caps or chords, or plastics, as a relatively weak cast or molded core can be used with high strength skins to produce a very efficient structure.

Other objects and advantages of my invention will appear from the following description taken in connection with the accompanying drawings, wherein:

Figure 1 is a wing section showing the application of a truss core, embodying the features of this invention, to form a box beam in cooperation with the wing spars and skin.

Figure 2 is an enlarged perspective view of the truss core of this invention with the upper skin indicated by phantom lines.

Figure 3:
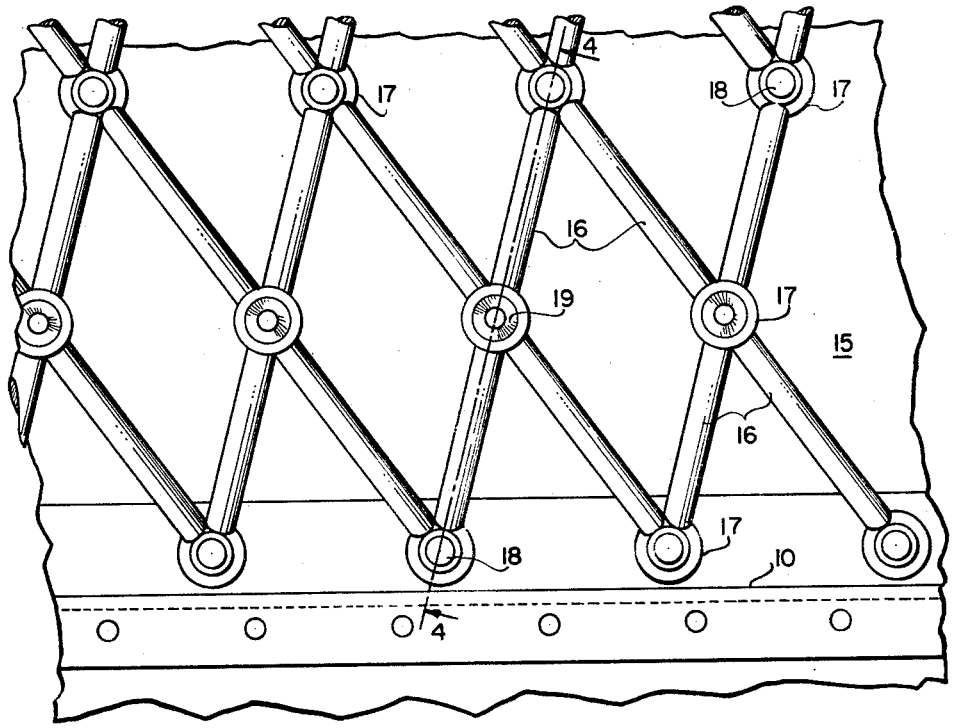
Figure 3 is a plan view of Figure 2.
Figure 4:
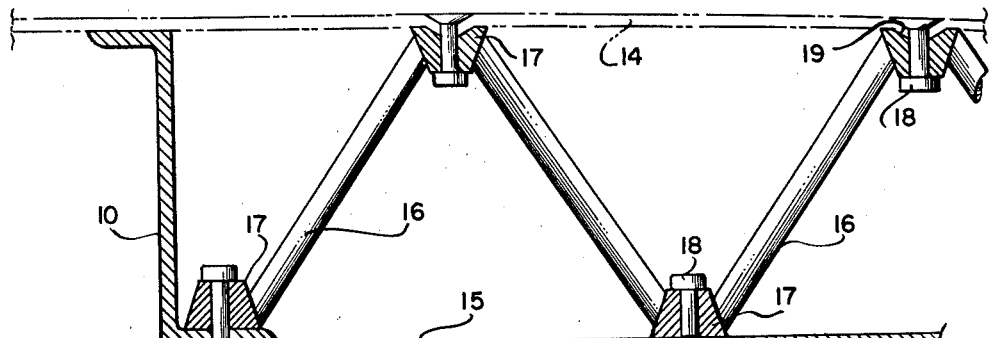
Figure 4 is a section taken on the line 4—4 of Figure 3.

I have chosen to illustrate my invention as applied in a wing section as shown in Figure 1 wherein front and rear wing spars 10 and 11 respectively support a nose or leading edge section 12 and a trailing edge section 13. The space between the spars is made into a box beam defined by the spars and upper and lower wing skins or covers 14 and 15, the truss core of this invention being incorporated in the box beam to transfer shear loads along the beam resulting from the bending and torsion loads thereon, and to support and stabilize the skins. In panels not requiring both skins to present a smooth surface, the inner skin can be perforated to form a grid interconnecting the attachment points for the core to be now described.

The truss core of this invention comprises diagonal elements 16 joined at junction points or bosses 17 to form the shear carrying members of a truss continuous in all directions. The truss is completed by the attachment of the bosses 17 to the skins 14 and 15 forming the top and bottom of the box beam. To better visualize the construction consider a row of alternately disposed diagonals in a common plane disposed at an angle other than a right angle to the covering skins, and another set of diagonals in a different plane with the two planes of diagonals intersecting and joined at one edge to each other and to the skin covering. The pattern formed by the diagonals thus produces alternating peaks and valleys which may be disposed substantially parallel to the side beams or spars 10 and 11 for aid in access to the inner sides of the bosses 17 for fastening the latter to the cover skins 14 and 15. Additionally, the diagonals in such planes intersect at the bosses to define transverse planes running from one beam or spar to the other thus forming a space framework where each boss attached to one skin has diagonals connected thereto that spread out in several directions to join other bosses attached to the opposite skin.

Each element 16 of the core serves as the diagonal member of a truss; i. e. the shear carrying element of the truss. The core alone is an incomplete structure; the addition of skins or cap members on both faces of the core completes the structure, which becomes a space framework by virtue of the continuity of the shear diagonals and the chords or caps in all directions. Thus the complete structure may be likened to a gridwork of beams which is capable of transmitting shear, bending, and axial loads in any direction, the direction of transmission being determined solely by the location and direction of the applied loads and the external supports.

In a wing or other cantilever beam it is structurally sound practice to taper the depth and skin thickness towards the wing tip, and any change in the depth, skin thickness and loading may desirably be accompanied by changes in spacing of the truss bosses 17 and the size of the truss members or diagonals to obtain the best efficiency.

With such arrangements it is possible to combine a relatively weak core with high strength skins to obtain maximum efficiency from the combination. Moreover, dissimilar materials may be used for the core and skins without encountering trouble from differential thermal expansion. For example a molded plastic core can be used with a laminated fiberglass skin, or aluminum or magnesium alloy cast cores can be used with stainless steel or titanium skins, to mention metal combinations having dissimilar coefficients of expansion.

Figure 5:
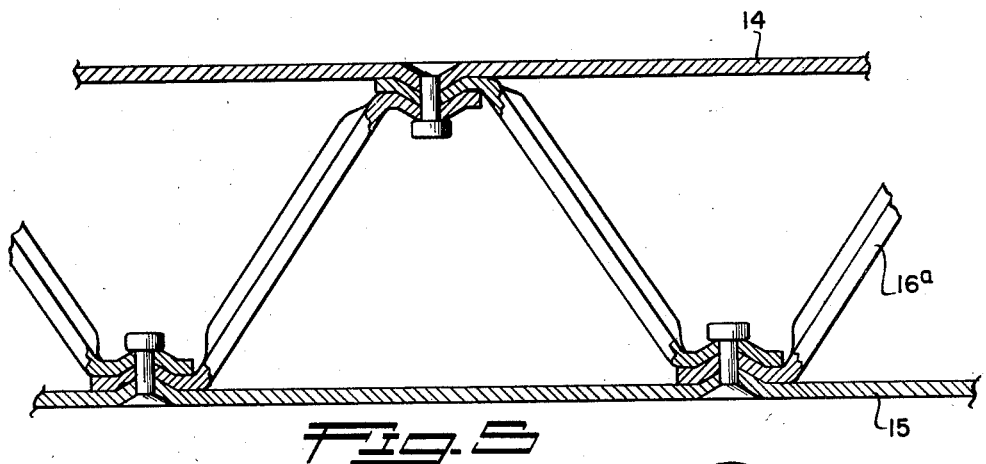
Figure 5 illustrates an alternative method of forming the core.
Figure 6:
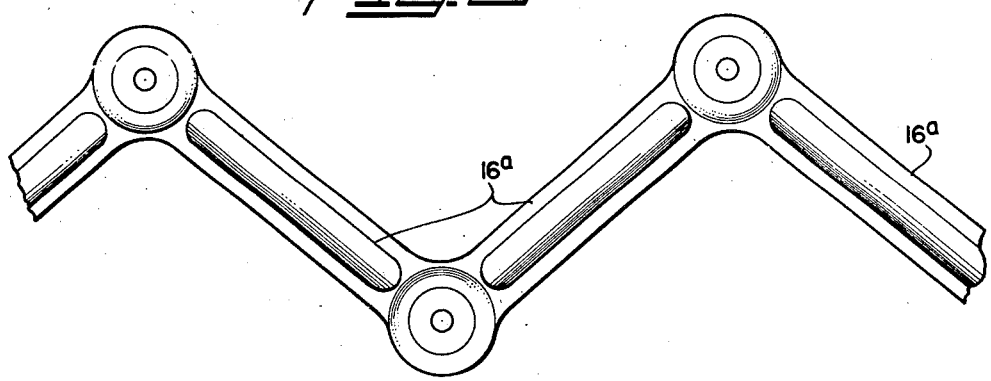
Figure 6 is a view of one developed sheet metal element as used in Figure 5.

The separate truss core may be made in many ways, as for example casting, molding, or forging or by blanking and forming or expanding flat plate stock. Also, rods of the desired size of the diagonals can be bent into zig zag form and the bosses applied to the adjoining peaks of such preformed rods by casting, welding or forging thereto. Also, the elements 16 lying in one plane may be stamped from a strip of sheet material and then assembled as shown in Figures 5 and 6 to form the complete core.

The bosses 17 may be attached to the skins by any of the usual fastening methods such as countersink rivets 18 in dimpled holes 19 or other types of permanent or removable fastenings. If necessary to buck rivets so used the valleys between the rows of bosses 17 positioned adjacent one skin provide for ready entry of bucking bars parallel to the spars for bucking the rivets in the bosses adjacent to the other skin.

It will be evident that the truss core of my invention may be so formed as to conform to convex or concave wing skins or the generally circular section of nacelles and fuselages, and that wing spars need not be parallel but may converge, as in tapered wing plan forms.

Having thus described my invention and the present preferred embodiments thereof, I desire to emphasize the fact that many modifications may be resorted to in manner limited only by a just interpretation of the following claim.

I claim:

An airfoil structure comprising spaced beams extending spanwise of the airfoil, upper and lower covering skins extending from beam to beam, and an internal truss core within the structure comprising a multiplicity of rod-like shear transmitting elements, and bosses on the ends of the elements attached to the skins, each boss having a plurality of rod-like elements extending in different directions therefrom in diagonal relation to the skins to spaced bosses at the opposite skin, the several elements which extend from each boss having their longitudinal axes intersecting in the plane of the adjacent skin, said bosses being arranged in spanwise rows substantially parallel with said beams, the individual bosses of any three consecutive rows being staggered spanwise with respect to all other bosses in said three rows and also in oblique alignment with a boss of each adjacent row.

References Cited in the file of this patent

UNITED STATES PATENTS

| | | |
|---|---|---|
| 1,775,513 | Chilton | Sept. 9, 1930 |
| 2,122,709 | Barkley | July 5, 1938 |
| 2,311,683 | Naugle | Feb. 23, 1943 |
| 2,503,450 | Nebesar | Apr. 11, 1950 |

FOREIGN PATENTS

| | | |
|---|---|---|
| 561,214 | Great Britain | May 10, 1944 |